UNITED STATES PATENT OFFICE.

FRANÇOIS FABRE, OF MARSEILLES, FRANCE.

IMPROVEMENT IN THE MANUFACTURE OF BRICKS, TILES, &c., FROM SLAG.

Specification forming part of Letters Patent No. 103,591, dated May 31, 1870.

*To all whom it may concern:*

Be it known that I, FRANÇOIS FABRE, of Marseilles, in the Department of the Bouches du Rhone and Empire of France, manufacturer, have invented certain Improvements in the Manufacture of Bricks, Tiles, Pottery-Ware, and analogous articles from the dross of blast-furnaces agglomerated with hydraulic lime or any other binding material, of which the following is a specification:

Hitherto every attempt to utilize the dross of blast-furnaces has failed, either because the articles manufactured from this material were defective, of bad quality, and unsalable, or that the cost price consequent upon the arrangement necessary for obtaining good materials was too high.

In order to manufacture from this dross products fulfilling all the requisite conditions for building and other materials, I profit by a method known to manufacturers, and which consists in reducing the dross into fine granular particles by plunging it into cold water as it issues from the blast-furnace, while still in fusion and incandescent. The dross is thus reduced to a state of coarse sand, suitable for undergoing the treatment to which I submit it.

Further, this operation permits the elimination of the calcareous matters, and also of the particles of iron which might be in the dross, and not only have the effect of spoiling the appearance of the brick, but also of producing spots of rust, which would eat through any coatings that might be applied.

The dross having been transformed, as above stated, into coarse sand, and still retaining, as it issues from the tanks, a certain degree of moisture, is immediately mixed with a proportion of hydraulic lime, which varies according to the degree of hardness and impermeability to be given to the bricks or other products. The mixing is effected with the shovel, or by an ordinary mixing-machine, such as is used for making mortar.

When thoroughly mixed, the material is placed in molds of any shape and size, and subjected to powerful pressure, obtained in any suitable manner, and thus bricks, tiles, and other articles are produced, which, on leaving the molds, are stacked, and thus left to dry.

In the course of a few days the articles prepared as above stated will acquire a great degree of hardness, be as sonorous as bricks made from burned clay, when broken present a perfectly homogeneous appearance, possess great strength to resist pressure, and be particularly impervious to moisture.

Bricks thus made may be broken by a hammer, possess the great advantage for building purposes of being very light, of readily receiving coatings, and also of thoroughly adhering to mortars and cements.

Further, the bricks thus made from dross are infusible, do not split by heat, and are very refractory, which makes them particularly suitable for furnaces and chimneys. When used for buildings, either as bricks or tiles, their refractory nature is very advantageous, as they do not permit the sun's ray to penetrate, and during the winter retain the heat in the house—properties equally valuable in hot and cold climates.

I also manufacture bricks and other articles from dross reduced to the condition of a coarse sand in the manner above described, agglomerating it in any suitable manner with fire-clay, ordinary clay, chalk of various kinds, cements, and, in short, any binding materials of whatever nature and however obtained.

I claim as my invention—

The manufacture or preparation of a new product obtained from the dross of blast-furnaces plunged into cold water while still in fusion and incandescent, and its agglomeration with binding materials of any kind suitable for making solid or hollow bricks, burned or not, flat or hollow tiles of all sizes and of any kind, slabs and flooring-tiles of all kinds, cubes of various kinds, ornamented or not, pottery-ware, jars, pipkins, and, generally, all articles of ceramic ware, gas-retorts, drain-pipes, fire-bricks, baked or not, and with or without addition of clays or sand other than dross treated as herein described, and for making any analogous articles.

FRANÇOIS FABRE.

Witnesses:
F. OLCOTT,
C. F. CHIRION.